United States Patent [19]

Kaminski

[11] Patent Number: 4,486,848
[45] Date of Patent: Dec. 4, 1984

[54] MICROPROCESSOR PARALLEL ADDITIVE EXECUTION OF A COMPUTER COUNT ONES INSTRUCTION

[75] Inventor: David G. Kaminski, Bloomington, Minn.

[73] Assignee: Sperry Corporation, New York, N.Y.

[21] Appl. No.: 402,523

[22] Filed: Jul. 28, 1982

[51] Int. Cl.³ .............................................. G06F 7/38
[52] U.S. Cl. ..................................................... 364/715
[58] Field of Search ................ 364/715, 200 MS File, 364/900 MS File; 371/53

[56] References Cited

U.S. PATENT DOCUMENTS 4,189,716 2/1980 Krambeck ........................... 364/715

OTHER PUBLICATIONS

Kilburn et al., "Digital Computers at Manchester University", *Proc. of the Ins. of Electrical Engineers*, Oct. 1953, pp. 487–500.

Primary Examiner—James D. Thomas
Assistant Examiner—Dale M. Shaw
Attorney, Agent, or Firm—William C. Fuess; Kenneth T. Grace; Marshall M. Truex

[57] ABSTRACT

A data word of less than or equal to $2^N$ bits is counted for the number of binary "1's" contained therein in $\log_2 2^N = N$ cycles of 3 steps each in a microprocessor. As a first step the data in a first register is logically ANDed in an arithmetic logic unit (ALU) with a mask constant from a first read only memory (ROM), with a first logical product result placed in a second register. As a second step the data from the first register is logically ANDed in the ALU with the same mask constant complemented, and a second logical product result is placed in the first register. Meanwhile, the first logical product result in the second register is shifted in a shift matrix in accordance with a shift count constant obtained from a second ROM. As a third step the shifted first logical product result from the shift matrix is ADDed in the ALU with the second logical product result from the first register, and a sum result is placed in the first register as data. During the N iterative cycles the mask constants of $2^N$ bits progress (alternate 1's and 0's), (alternate pairs of 1's and 0's), ..., (half 1's and half 0's) while the shift constants progress $2^0, 2^1, 2^2, ..., 2^{N-1}$. After N iterative cycles of 3 steps each, the number of binary 1's in the original data word of $2^N$ bits is in the first register.

6 Claims, 4 Drawing Figures

EXAMPLE: PARALLEL ADDITIVE COUNT ONES FOR A FOUR BIT WORD

```
LINE
 1   DATA                    1110
 2   FIRST MASK                      1010
 3   DATA ∧ FIRST MASK       1110 ∧ 1010  =  1010
 4   DATA ∧ FIRST MASK       1110 ∧ 0101  =  0100

5   ALIGN (SHIFT RIGHT 1)   0101
 6   ADD                    +0100
 7   DATA'                   1001
 8   SECOND MASK                     1100
 9   DATA' ∧ SECOND MASK     1001 ∧ 1100  =  1000
10   DATA' ∧ SECOND MASK     1001 ∧ 0011  =  0001

11   ALIGN (SHIFT RIGHT 2)   0010
12   ADD                    +0001
13   RESULT                  0011
```

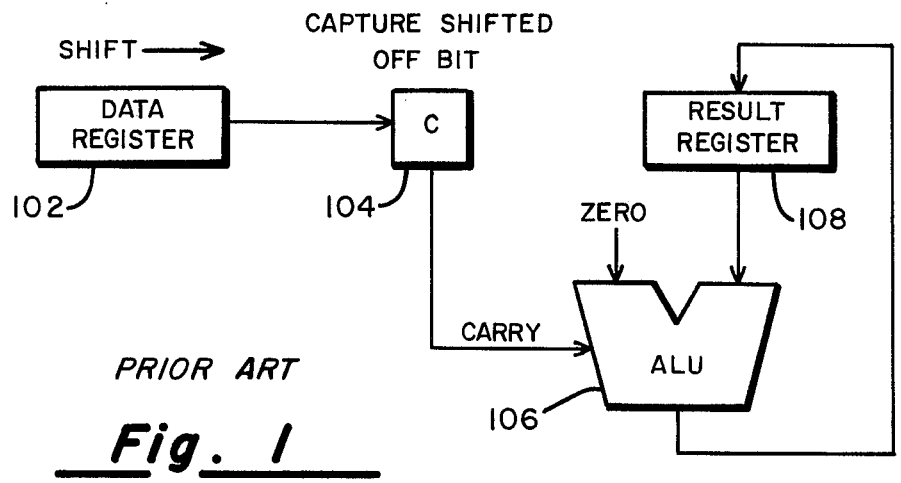
*PRIOR ART*
_Fig. 1_
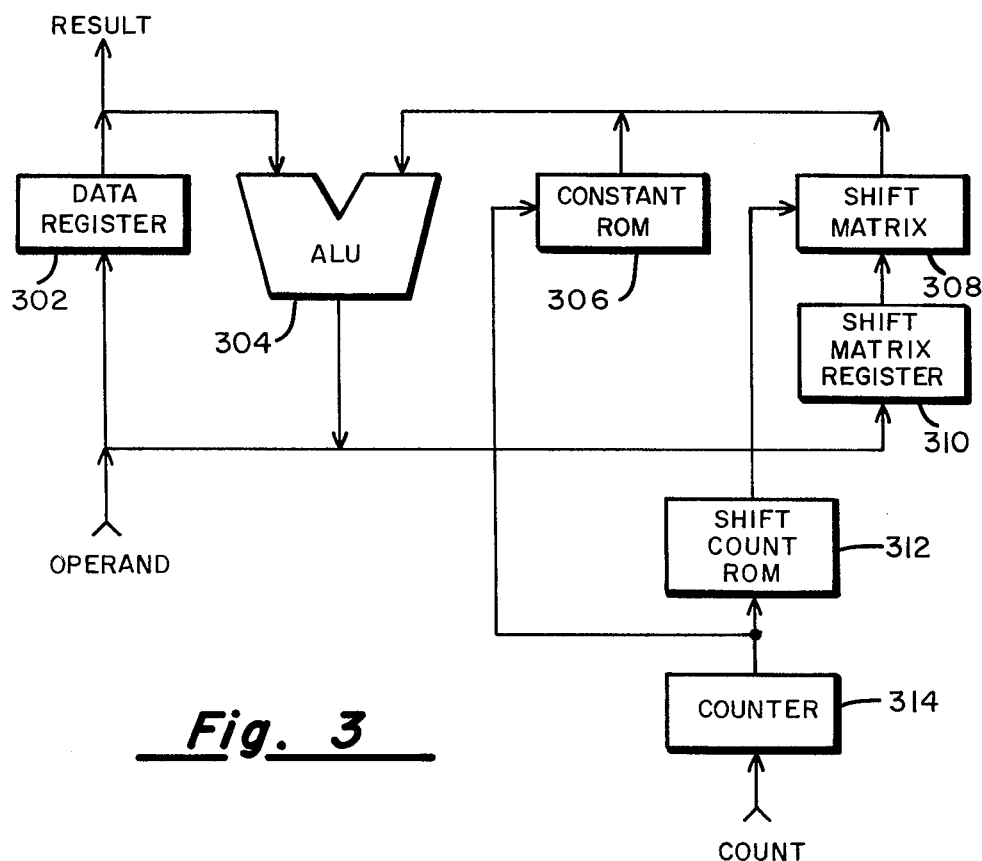
_Fig. 3_

EXAMPLE: PARALLEL ADDITIVE COUNT ONES FOR A FOUR BIT WORD

| LINE | | | |
|---|---|---|---|
| 1 | DATA | 1110 | |
| 2 | FIRST MASK | 1010 | |
| 3 | DATA ∧ FIRST MASK | 1110 ∧ 1010 | = 1010 |
| 4 | DATA ∧ $\overline{\text{FIRST MASK}}$ | 1110 ∧ 0101 | = 0100 |
| 5 | ALIGN (SHIFT RIGHT 1) 0101 | | |
| 6 | ADD | +0100 | |
| 7 | DATA' | 1001 | |
| 8 | SECOND MASK | 1100 | |
| 9 | DATA' ∧ SECOND MASK | 1001 ∧ 1100 | = 1000 |
| 10 | DATA' ∧ $\overline{\text{SECOND MASK}}$ | 1001 ∧ 0011 | = 0001 |
| 11 | ALIGN (SHIFT RIGHT 2) 0010 | | |
| 12 | ADD | +0001 | |
| 13 | RESULT | 0011 | |

MICROPROCESSOR PARALLEL ADDITIVE EXECUTION OF A COMPUTER COUNT ONES INSTRUCTION

BACKGROUND OF THE INVENTION

The repetoire of digital computers commonly contains a count ones instruction, which instruction computes the number of bits in a data word which are equal to binary "1". This computer count ones instruction may be implemented either under discrete logical or microprogrammable control. The generalized prior art computer logical structure for the implementation of a computer count ones instruction is shown in FIG. 1. The count ones instruction is typically implemented by shifting the data word as resides in DATA REGISTER 102 one bit at a time. The shifted-off bits are captured as represented by block C 104 and then added together, one at a time, by inserting them as the carry of an add operation performed within ALU 106. The intermediary sum is held in RESULT REGISTER 108. At the conclusion of the shifting and adding together of all bits, RESULT REGISTER 108 contains the final number of ones which were within the original data word.

The prior art method of performing the count ones instruction requires a shift and an add for each bit in the data word. Special hardware can combine the shift operation and the add operation into a single computer clock cycle in order to give a net instruction execution rate of one clock cycle per data word bit. If the embodiment of the shift operation and the add operation was enabled under microprogram control, one micro instruction execution time would be required for each bit within the data word. For example, a data word of 32 bits would require a minimum of 32 clock cycles, or microinstruction times, for execution of the computer count ones macroinstruction.

SUMMARY OF THE INVENTION

The present invention is a method for implementing the computer count ones instructions utilizing parallel arithmetic. It may be generally implemented in a microprogrammed computer which contains a parallel arithmetic logic unit (ALU), a shift matrix, and the ability to generate constants. These logical structures required are normally available in a microprocessor and are utilized during the performance of the present inventive method in a conventional manner. Thusly, the present invention of microprocessor parrallel additive execution of the computer count ones instruction utilizes logical structures and microinstruction control such as are generally available within a microprocessor, but in a differential manner in both the elements involved and the sequence of operations from prior art performance of the count ones instruction.

The method of the present invention involves a series of steps wherein the data word is masked with a mask and with a complement of such mask. The resulting masked data words are aligned and then added in parallel to sum the bits. A succession of patterns are utilized as mask quantities. The first mask pattern will be alternating binary 1's and 0's, such pattern as will allow room for the carries resulting from sums during the parallel addition. The second mask pattern will be alternating pairs of 1's and 0's. The final mask pattern will be half binary 1's and half binary 0's. The total number of iterations required in the execution of the computer count ones macroinstruction is the log base 2 of the data word length. For example, a 32 bit number requires log base 2 of 32, or 5, iterations in the execution of the count ones instruction. Each iterative step of the present invention requires 3 steps: (1) the logical ANDing of the data and the mask, (2) the logical ANDing of the data and the complemented mask, (3) shifting for alignment, and adding. The 3 steps times the 5 iterations means that it requires a total of 15 microcycles to count the binary one bits in a 32 bit word, as opposed to the 32 microcycles which would be required by the prior art method.

Correspondingly, it is a first object of the present invention that the number of computer operational cycles, or microcycles, required in the execution of the count ones instruction should be minimized. It is a second object of the present invention that the method should be extendible to a data word of any length. It is a third object of the present invention that the method should be exercisable with logical functional sections such as data registers, arithmetic logic units, ROM's and a shift matrix as are generally available in a microprocessor, and that such logical sections should be interrelatedly exercised (albeit in a novel sequence) by commonly available microinstructions. In other words, it is this third objective that the present method of microprocesor parallel-additive execution of count ones algorithm should be capable of generalized execution upon existing microprogrammed computer logical structures, and does not require special or abnormal hardware in order to realize the faster execution time of the computer count ones instruction accorded by the method of the present invention.

BRIEF DESCRIPTION OF THE DRAWINGS

FIG. 1 shows a prior art functional block diagram for the performance of the computer count ones instruction.

FIG. 3 shows the logics required to implement the method of the present invention, such logical structures and logical interconnection as are commonly available within a modern digital computer and such as are capable of control via a microprogram as well as discrete logics.

DESCRIPTION OF THE PREFERRED EMBODIMENT

The prior art method for the performance of the computer count ones instruction is diagrammatically illustrated in FIG. 1. This method requires that successive bits be shifted off from the data word in DATA REGISTER 102, captured in latch C 104 and successively inserted as the carry of an add operation performed in arithmetic logic unit ALU 106 in the generation of the result within RESULT REGISTER 108. When the shifting and the adding are performed within a single computer clock cycle, the net instruction execution time is one clock cycler per bit of the original data word as lodged in DATA REGISTER 102.

Figure 2:
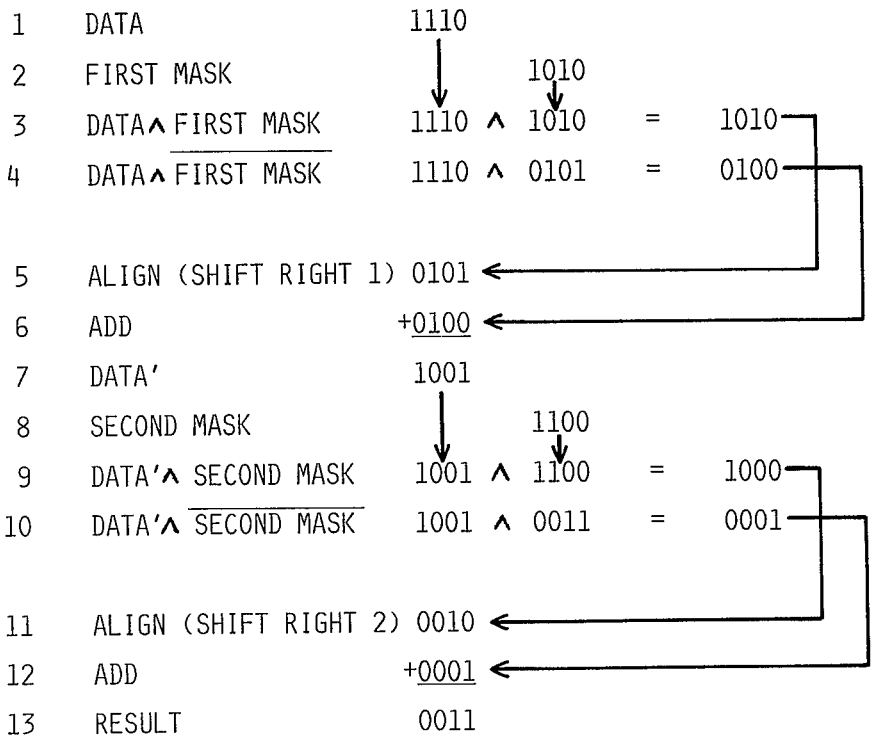
FIG. 2 shows the method of the present invention for the example of counting ones in a four bit data word.

The parallel additive count ones method of the present invention is diagrammed in FIG. 2 for the example of a 4 bit DATA word. The DATA word in line 1 is, by example, binary 1110. The FIRST MASK word in line 2, equal in the number of bits to the DATA word, is alternate binary 1's and 0's, or 1010. The logical ANDing of the DATA quantity with the FIRST MASK quantity is represented in line 3, producing result 1010. The logical ANDing of the DATA quantity and the complement of the FIRST MASK quantity, or FIRST MASK, is represented in line 4, producing result 0100. The first alignment of the quantity developed in line 3, an alignment accomplished by shifting right 1 (ALIGN (SHIFT RIGHT 1)), is illustrated in line 5 producing quantity 0101. To the aligned quantity of line 5 (0101), the quantity of line 4 (0100) is added (ADD) in line 6 producing intermediary result DATA' equals 1001 in line 7. Upon this intermediary quantity DATA' of line 7, a next subsequent, SECOND MASK word of alternate pairs of binary 1's and 0's, or 1100 as is shown in line 8, will be applied. The logical ANDing of the intermediate quantity DATA' and this SECOND MASK word is shown in line 9, producing result 1000. The logical ANDing of this intermediary quantity DATA' and the complement of the second mask, or SECOND MASK, is shown in line 10 producing result 0001. An alignment of the quantity produced in line 9 by a new, second alignment shift of shift right 2 (ALIGN (SHIFT RIGHT 2)) is shown in line 11, producing quantity 0010. When this aligned quantity of line 11 (0010) is added (ADD) to the quantity developed in line 9 (0001) as shown in line 12, the net total RESULT of 0011 is shown in line 13. This RESULT quantity equaling 3 is the number of 1's which were contained within the original 4 bit DATA word 1110 shown in line 1.

The generalized iterative parallel additive method for counting the number of binary "1" bits within a data word of $2^N$ or fewer total bits will require N total mask word constant quantities of $2^N$ bits each, N total shift count constant quantities, and will be performed in N iterations. The N total mask words of $2^N$ bits each are in a progression from alternate binary 1's and 0's to alternate pairs of binary 1's and 0's, to alternate quandratures of binary 1's and 0's, and so on until one-half, or $2^{N-1}$, bits are binary 1's and one-half, or $2^{N-1}$, bits are binary 0's in the last, Nth, mask word quantity. The N shift count quantities are of the series $2^0, 2^1, 2^2, \ldots 2^{N-2}, 2^{N-1}$ which is alternatively expressed as 1, 2, 4, 8, $\ldots 2^{N-1}$. For all words equal to or less than $2^N$ bits, $\log_2 2^N$ or N iterations will be required to effect a solution utilizing the present parallel additive method. In the illustration by example in FIG. 2, $\log_2 4 = \log_2 2^2 = 2$ iterations are required. These 2 iterations are respectively lines 1-7 and 8-13.

Before the example of FIG. 2 is left, it should be noted that an equivalent implementation of the method illustrated could employ complemented mask words (i.e., progressions of alternate binary 0's and 1's) if the products developed as the data ANDed with the complement of the mask were the products to be right shifted (as opposed to the product of the data and the mask). If this equivalent implementation of the method was performed for the example shown in FIG. 2, then a first mask word in line 2 of the alternate binary 0's and 1's, or 0101, would produce result 0100 in line 3. The logical ANDing of the DATA quantity and the complement of this now FIRST MASK quantity would produce result 1010 in line 4. Then if the quantity developed on line 4 (now 1010) instead of the quantity developed on line 3 were to be aligned by shifting right one (producing 0101) and added to the new quantity developed on line 3 (now 0100) then the result DATA' on line 7 would still be 1001. In other words, whether the masks utilized by the method of the present invention should be alternate 1's and 0's (shown in the example of FIG. 2 and generally used in this description of the preferred embodiment) or alternative 0's and 1's, is simply determined by which of the two products formulated from each mask will be shifted for alignment.

The method illustrated by example in FIG. 2 may be considered to be adding the 1's within a data word by parallel addition of successive parts. For each iteration the applied mask to identify such successive part is changed, progressing from alternate binary 1's and binary 0's to a final mask pattern which is half binary 1's and half binary 0's for the width of the data word. Additionally, the shift count for data alignment is changed in a progression of the powers of 2 (1, 2, 4, 8, 16, etc.) for correct data alignment during successive iterations. That the method is iterative may be discerned by comparison of lines 1-6 and lines 7-12.

The apparatus for the performance of the method of the present invention is shown in block diagram form in FIG. 3. The DATA REGISTER 302 is a general data and scratch pad register equal in width to the data word. The ALU 304 is a parallel arithmetic logic unit which is capable of being controlled both to perform the logical AND and add operations. The COUNTER 314 is a register capable of being loaded and decremented under logical control in order to maintain the count of the iterations required in the present method. The current iteration count from COUNTER 314 is utilized to directly address CONSTANT ROM 306 and SHIFT COUNT ROM 312. The addressing of CONSTANT ROM 306 by the current iteration count received from COUNTER 314 generates a constant word in accordance with such addressing. These constant words derived from CONSTANT ROM 306 are the mask word constant quantities utilized in the method of the present invention. In a like manner, the SHIFT COUNT ROM 312 is addressed by the current iteration count derived from COUNTER 314. The quantity output from SHIFT COUNT ROM 312 responsively to such addressing is a shift count which is applied to SHIFT MATRIX 308. Successive such shift counts are addressed in, and output from, SHIFT COUNT ROM 312 during successive iterations of the method of the present invention. Such iterations may be accounted for by the iteration count maintained in COUNTER 314 or, as is more convenient in many microprocessor structures in which the present invention is implementable, the iterations may be controlled by a microprogram loop counter (not shown). The SHIFT MATRIX REGISTER 310 is a holding register wherein quantities received from ALU 304 prior to shift within SHIFT MATRIX 308 may be lodged.

In abbreviated form, each iteration of the method of the present invention or parallel additive execution of the computer count ones instruction requires the following three steps in the utilization of the digital logic elements shown in FIG. 3. As a first step, the data in DATA REGISTER 302 is logically ANDed with a constant from CONSTANT ROM 306 in ALU 304 and the result is placed in SHIFT MATRIX REGISTER 310. As a second step, the data from DATA REGISTER 302 is logically ANDed with the mask from CONSTANT ROM 306 received at ALU 304 in the complemented form (thereby the complemented mask, or MASK) and the result is stored in DATA REGISTER 302. (Note that at the conclusion of this step, the original contents of DATA REGISTER 302 are lost. In a third step, the contents of DATA REGISTER 302 are added in ALU 304 with the contents of SHIFT MATRIX REGISTER 310 as appropriately shifted in SHIFT MATRIX 308 enroute to ALU 304. The results of this addition are placed in DATA REGISTER 302. (Note again that the original contents of DATA REGISTER 302 at the beginning of this third step are lost.) In the background of either the second or the third step, the iteration count maintained in COUNTER 314 is updated. if the total number of iterations performed equals log base 2 of a data word length, then the last sum lodged in Data REGISTER 302 is the resultant answer for the determination of the number of logical 1's within the original data word.

The process control and selection required in the implementation of the parallel additive execution of a count ones instruction upon the logic elements block diagrammed in FIG. 3 is nominally accomplishable under microprogrammed control. The exact partitionment of how much control sequencing is possible within a single clock cycle is dependent upon the exact nature and sophistication of the microinstruction repetoire, such as enables the appropriate micro-operation. Nominally, however, only 5 separate microinstructions of modest sophistication are required to effectuate the appropriate control for the execution of the parallel additive count ones operation on the logical structure as shown in FIG. 3. The necessary control effected by each such microinstruction will become obvious in the following detailed explanation, such as also partitions the total operations performed into that which would likely transpire upon each single clock cycle in a microprogram controlled logical structure.

Upon a first preliminary clock cycle, a first microinstruction would load the DATA REGISTER 302 with the operand derived from external sources, such as a memory (not shown). Such operand quantity as lodged in DATA REGISTER 302 becomes the current data quantity.

Upon a second preliminary clock cycle, the COUNTER 314 would be loaded with an iteration count. For purposes of the present detailed explanation, it will be assumed, by example, that such iteration count equals 5 such as will permit the determination of the number of 1's within a 32 bit data quantity. Such an initial count lodged in COUNTER 314 becomes the current count. The current count is applied from COUNTER 314 to select the current constant from CONSTANT ROM 306. In the present example, such first constant will be assumed to be hexadecimal number AAAAAAAA, or alternate 0's and 1's for 32 bits. The current count from COUNTER 314 is also applied to select the current shift count from SHIFT COUNT ROM 312. In the present example, the first shift count selected will be decimal number 1. This current shift count is applied from SHIFT COUNT ROM 312 to SHIFT MATRIX 308.

Beginning the first step of the three step, three microinstruction, iterative loop for parallel additive execution of a computer count ones instruction, a first microinstruction step may be considered to accomplish the logical ANDing of the current data quantity and the current mask quantity. Specifically, the ALU 304 is controlled to perform the logical AND operation. The current data quantity is transferred from DATA REGISTER 302 as a first input to ALU 304. The current constant as selected from CONSTANT ROM 306 is applied as the current mask to be a second input to ALU 304. The quantity output from ALU 304 upon the performance of the logical AND operation is designated "logical product 1" and is stored in SHIFT MATRIX REGISTER 310.

As the second iterative step in the parallel additive execution of a computer count ones instruction, a microinstruction step which can be considered the logical ANDing of the data and the complemented mask is performed. The current data is again transferred from DATA REGISTER 302 to be a first input to ALU 304. The current constant from CONSTANT ROM 306 is received at ALU 304 in complemented form, therefore equivalent to transferring the complement of the current constant, or current constant from CONSTANT ROM 306 to ALU 304. The ALU 304 is controllably maintained to perform the logical AND operation. Thusly, the current data and current constant are logically ANDed in ALU 304 and transferred as "logical product 2" to DATA REGISTER 302. Meanwhile, during the performance of this second step and second microinstruction, the quantity in SHIFT MATRIX REGISTER 310 (logical product 1) will have been shifted in SHIFT MATRIX 308 under the control of the shift count received from SHIFT COUNT ROM 312, and will be available at the output of such SHIFT MATRIX 308 as quantity "shifted logical product 1". The development of such shifted logical product 1 quantity normally requires no special microprogram control enablement, but is rather simply the shifting of the quantity received from SHIFT MATRIX REGISTER 310 within SHIFT MATRIX 308.

As a third microinstruction step in the parallel additive execution of a count ones instruction, a microinstruction which will add the quantities contained within DATA REGISTER 302 and SHIFT MATRIX 308 within ALU 304 is performed. Specifically under the control of such microinstruction, the logical product 2 quantity now contained within DATA REGISTER 302 is transferred to ALU 304 as a first input quantity. The shifted logical product 1 quantity from SHIFT MATRIX 308 is likewise transferred to ALU 304 as a second input quantity. The ALU 304 is controlled to perform the add operation. The resultant output of ALU 304 from the addition of shifted logical product 1 and logical product 2 quantities is called the current result. This current result quantity is transferred from ALU 304 to DATA REGISTER 302. Thusly upon the performance of the three steps of the first iterative cycle a first partial result, called a current result, is lodged in DATA REGISTER 302.

A condition update and a controlled branch is performed additionally, normally concident with the performance of the third step microinstruction. This condition update is simply that COUNTER 314 is decremented by 1, and a branch is made to the first step microinstruction conditional upon the count not equalling 0. Alteratively, if the count within COUNTER 314 is decremented to 0, then, the iteration loop having been executed (in the example) 5 times, the parallel additive execution of a computer count ones instruction is complete, the iterative routine is exited. and the current result lodged in DATA REGISTER 302 is the final result. To repeat, this condition update and branch control is normally available within the execution of a microinstruction which additionally accomplishes additional purposes; herein the third microinstruction which accomplishes the adding of shifted logical product 1 and logical product 2. If the microinstructional based control over the logic elements of FIG. 3, such logical elements as commonly occur within the implementation of digital computers, is insufficiently complex so that the total function of updating the condition and branching conditionally can be accomplished simultaneously with an arithmetic operation, then the operations of this paragraph needs be performed as a separate, fourth, step requiring a separate, fourth, microinstruction. In this case of microinstructional control insufficiently sophisticated to select the data sources and effectuate the third step add as well as updating COUNTER 314 and performing a conditional branch dependent upon the updated current count therein, then the iteration loop for performance of the parallel additive execution of a computer count ones instruction would be considered to be 4, not 3, steps and microinstructions in length.

In most microprocessors in which the method of the present invention is performed, the iteration count will be maintained in a program loop counter (not shown in FIG. 3) and that index count contained in COUNTER 314 need not, although updated during each iteration, serve as the iteration loop control. Howsoever iteration loop control is effectuated, whether by reference to COUNTER 314 or some other loop counter, the two logical product and one add steps of the present invention needs be iteratively performed N times for a word equal to or less than $2^N$ bits.

When the count contained within COUNTER 314 is updated under microinstruction control through 5 successive values, the addressed constants from CONSTANT ROM 306 (the mask) and the address data from SHIFT COUNT ROM 312 (the shift count) will assume successive values. For the example of 5 iterative cycles, such as are sufficient in the current method to count the ones within a 32 bit computer word, the successive constants derived from CONSTANT ROM 306 will be the following 32 bit numbers expressed in hexadecimal code: AAAAAAAA, CCCCCCCC, F0F0F0F0, FF00FF00, and FFFF0000. It may be observed that such hexadecimal numbers progress from an alternating 1's and 0's pattern, through alternating pairs of 1's and 0's, through higher order partitionment, to a final number which is half 1's and half 0's. Similarly, the successive quantities addressed in SHIFT COUNT ROM 312 which are the right-shift counts are the following decimal numbers: 1, 2, 4, 8, and 16. The manner by which both the mask quantities as derived from CONSTANT ROM 306 and the shift count quantities as derived from SHIFT COUNT ROM 312 are utilized in the performance of the present method for parallel additive execution of a computer count ones instruction may be reviewed within FIG. 2.

Figure 4:
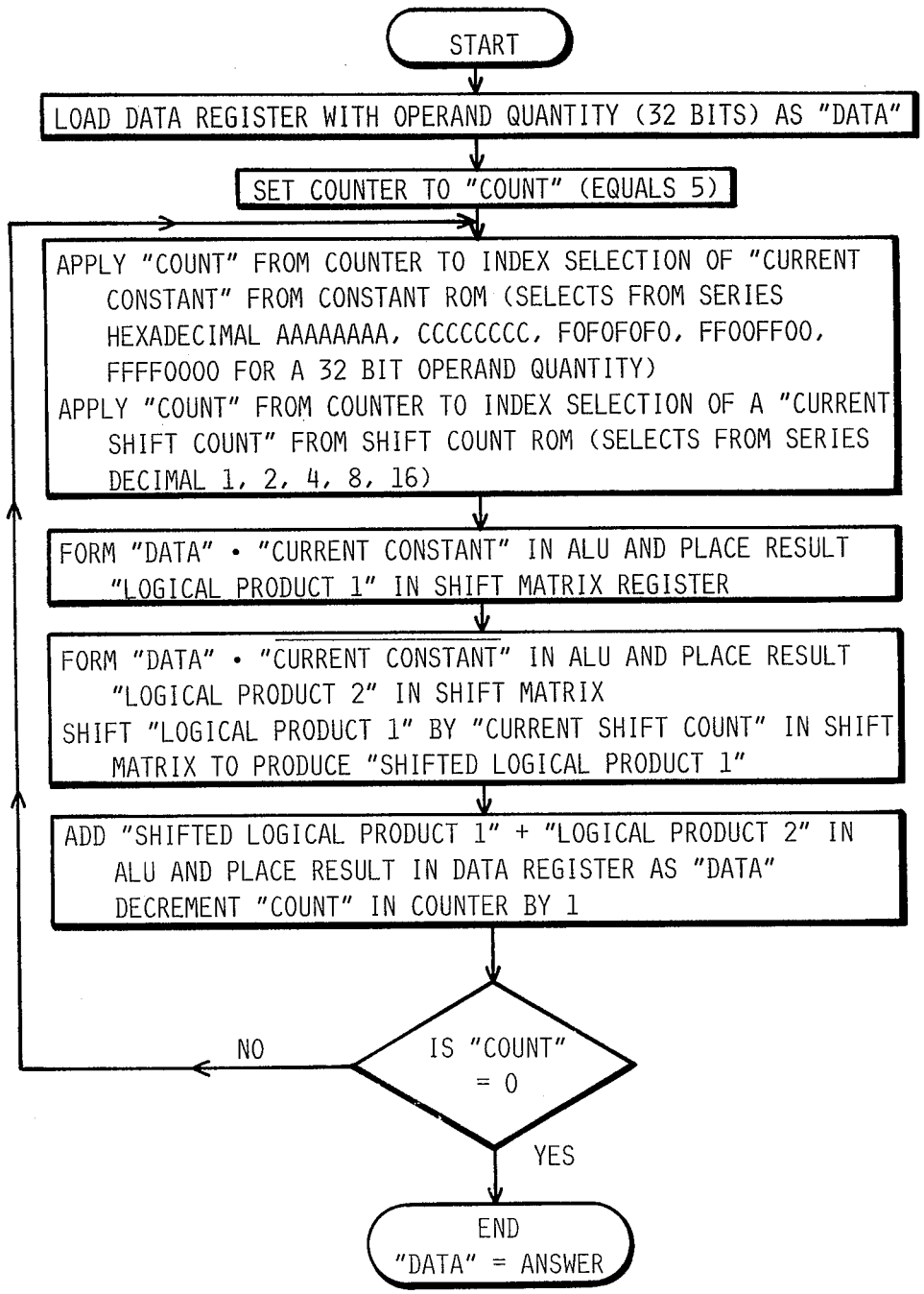
FIG. 4 shows the method of the present invention for the example of counting ones in a thirty-two bit data word.

It is obvious that the exercise of the logical structures in FIG. 3, suggested to be accomplishable by a practitioner in the computer arts under microprogram control, as was detailed in the preceding six paragraphs can be reduced to a flow chart of a microprogram. The representations of the logical functions performed within each block of a flow chart must necessarily be more abbreviated, less exact, and more arbitrary in the expressions employed than the preceding detailed explanation. A flow chart of the control sequences, nominally implementatable by microprogrammable control (although such control sequences could also be routinely derived from timing chains and discrete control logics) for the exercise of the logical structure shown in FIG. 3 in the performance of the parallel additive execution of a computer count ones instruction is shown in FIG. 4. The abbreviated representations contained within such flow charts are illustrated by the third block wherein the expression DATA REGISTER.-CONSTANT LOGIC really (in accordance with the preceding explanation), represents that the current data from DATA REGISTER 302 will be ANDed in ALU 304 with the current constant from CONSTANT ROM 306. As well as the abbreviated expressions occurring within the flow chart, it will be understood by a practitioner of the computer sciences that the control implementation of the method flow-charted could be accomplished in an alternative manner. For example, the update of the counter might be performed coincident with the second logical AND microinstruction, whereas a condition branch dependent upon the contents of such counter would still be performed coincident with the third, add, microinstruction. Similarly, the number of discrete control sequences represented may vary in number dependent upon the ability of the control logics, especially when such control logics are implemented as the microprogram, to simultaneously effectuate all sequences within an individual step during a single timed cycle. Most microinstruction repetoires are sufficiently sophisticated so that control over the limited elements and simple interconnections of the apparatus of FIG. 3 may be effectuated within a limited number of such microinstructions, such as are in number and functionality typically represented by the blocks shown in the control block diagram of FIG. 4.

While a specific preferred embodiment of the present invention of a method and apparatus for performing parallel additive execution of a computer count ones instruction has been described in detail as associated with a certain small number of designated logical components, and as associated with the preferred controlled sequences for exerting sequential information manipulation and control within such elements, it may be understood that the basic principles of the invention reside in the implementation of a particular method for performing the count ones instruction of a computer repetoire. Furthermore, although the invention has been particularly shown and described with reference to the preferred embodiment thereof, it will be understood by those skilled in the art that various alterations in form and detail may be made therein without departing from the spirit and scope of the invention. For example, it is possible to develop the sequential shift count in a multiplier circuit in lieu of utilizing SHIFT COUNT ROM 312 as shown in FIG. 3. It is also obvious that certain variations in the control sequence as block diagrammed in FIG. 4 will be possible in accomplishment of that parallel additive execution process diagrammatically represented by example in FIG. 2. It should be obvious that if the data as originally retrieved from memory and lodged in DATA REGISTER 302 shown in FIG. 3 is complemented, then the method of the invention will function as a count zeros instruction. Such possible variations should not detract from the essence of the present invention in teaching a method and apparatus for the parallel additive execution of a computer count ones instruction.

The embodiments of the invention in which an exclusive property or privilege is claimed are defined as follows:

I claim:

1. An iterative parallel additive method for counting the number of binary "1" bits within a data word of 2 total bits received in a first register, said method comprising:
first storing as a first memory store (CONSTANT ROM) an indexable series of N total mask word constant quantities; and
second storing as a second memory store (SHIFT COUNT ROM) an indexable series of N total shift count constant quantities; and
initializing an index count in a counter (COUNTER) as the current index; then
first referencing a current single one of said indexable series of N total mask word constant quantities in accordance with said current index; and
second referencing a current single one of said indexable series of N total shift count constant quantities in accordance with said current index; then
logically ANDing in an arithmetic logic unit (ALU) said data word from said first register (DATA REGISTER) and said current first referenced one of said mask word constant quantities from said first memory store, and emplacing the first logical product result in a second register (SHIFT MATRIX REGISTER); then
logically ANDing in said arithmetic logic unit said data word from said first register and the complement of said current first referenced one of said mask word constant quantities from said first memory store, and emplacing the second logical product result in said first register as said data word; and
shifting said first logical product result from said second register in a shift matrix (SHIFT MATRIX) in accordance with said current second referenced one of said shift count constant quantities; then
adding in said arithmetic logic unit said shifted first logical product result from said shift matrix with said data word from said first register, and emplacing the sum result in said first register as said data word; and
updating said current index contained in said counter; and
returning to said first referencing step and continuing until said updating step has been performed N times; then upon N performances of said updating step
stopping with said data word in said first register equalling said number of binary "1" bits within said data word.

2. The method according the claim 1 wherein said first storing step further comprises:
first storing as a first memory store an indexable series of N total mask word constant quantities of $2^N$ bits each and of the series (1) alternate binary 1's and binary 0's, (2) alternate pairs of binary 1's and binary 0's, (3) alternate quadratures of binary 1's and binary 0's, etc. until N) one-half binary 1's and one-half binary 0's.

3. The method according to claim 1 or claim 2 wherein said second storing step further comprises:
second storing as a second memory store an indexable series of N total shift count constant quantities of the series $2^0, 2^1, 2^2, \ldots, 2^{N-2}, 2^{N-1}$.

4. An iterative parallel additive method implemented upon digital logical elements for counting the number of binary "1" bits within a data word less than or equal to $2^N$ total bits; said method receiving as input quantities said data word in a first register (DATA REGISTER) as data, plus $\log_2 2^N = N$ mask word constant quantities in an indexable first memory store (CONSTANT ROM), plus
$\log_2 2^N = N$ shift count constant quantities in an indexable second memory store (SHIFT COUNT ROM), plus
an index count = N in a counter (COUNTER);
said method comprising:
referencing a current single one of said N mask word constant quantities from said indexable first memory store and a current single one of said shift count constant quantities from said indexable second memory store in accordance with said index count;
logically ANDing in an arithmetic logic unit (ALU) said data from said first register and said current single one of said mask word constant quantities, and emplacing the logical product in a second register (SHIFT MATRIX REGISTER);
logically ANDing in said arithmetic logic unit said data from said first register and the complement of said current single one of said mask word constant quantities and emplacing the logical product in said first register as data;
shifting said contents of said second register by said current single one of said shift count quantities in a shift matrix (SHIFT MATRIX);
adding in said arithmetic logical unit said shifted contents of said second register with said data from said first register, and emplacing the sum in said first register as data; and
consecutively updating said index count within said counter and returning to said referencing step until N index counts have been successively obtained; then
stopping with said counted number of binary "1" bits within said data word equalling said data quantity contained within said first register.

5. The method according to claim 4 wherein
N=5;
said N mask word constant quantities equal 32 bit hexadecimal numbers AAAAAAAA, CCCCCCCC, F0F0F0F0, FF00FF00, and FFFF0000; and
said N shift count constant quantities equal right shift count decimal numbers 1, 2, 4, 8, and 16.

6. In the processor of a computer containing
shift matrix register means for holding quantities; connected to
shift matrix means for shifting in accordance with a shift count, quantities received from said shift matrix register;
counter means for receiving and updating an index count;
shift count memory means responsive to said index count received from said counter means for supplying said shift count to said shift matrix means;
constant memory means responsive to said index count received from said counter means for supplying constant quantities;
data register means for receiving the operand data word, for storing intermediary computational products, and for holding the final result;
arithmetic logic unit means for receiving quantities from said data register means, said constant memory means, and said shift matrix means, and for performing arithmetic and logical operations upon quantities received, and for storing operational results in said data register means or said shift matrix register means;

control logics for causing said operand data word to be received by said data register, for causing said counter means to receive and to update said index count, for causing said arithmetic logic unit means to receive selected quantities and to perform AND or ADD operations and to store the results of said operations;

an improvement to said control logics allowing the performance of the count ones instruction in a parallel additive manner, said improvement comprising:

control means for firstly causing an operand data word of less than or equal to $2^N$ bits to be received by said data requester means, plus firstly causing said counter means to receive said index count;

control means for secondly causing the contents of said data register means to be logically ANDed with said constant quantity from said constant memory means within said arithmetic logic unit means, and for emplacing the result in said shift matrix register means in accordance with said shift count supplied by said shift count memory means;

control means for thirdly causing the contents of said data register means to be logically ANDed with the complement of said constant quantity from said constant memory means within said arithmetic logical unit means, and for emplacing the result in said data register means;

control means for causing said counter means to update said index count and for causing said control means for secondly causing, said control means for thirdly causing, and said control means for fourthly causing, to be successively sequentially reexercised until requisite N iterations have been performed, then for stopping said iterations with the answer quantity contained in said first data register.

* * * * *